United States Patent
Patel

(10) Patent No.: US 10,754,996 B2
(45) Date of Patent: Aug. 25, 2020

(54) PROVIDING PRIVACY PROTECTION FOR DATA CAPTURING DEVICES

(71) Applicant: PayPal, Inc., San Jose, CA (US)

(72) Inventor: Jinesh Pravin Patel, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 43 days.

(21) Appl. No.: 15/705,880

(22) Filed: Sep. 15, 2017

(65) Prior Publication Data

US 2019/0087608 A1 Mar. 21, 2019

(51) Int. Cl.
| | |
|---|---|
| *G06F 21/00* | (2013.01) |
| *G06F 21/83* | (2013.01) |
| *H04W 12/08* | (2009.01) |
| *H04L 29/06* | (2006.01) |
| *G06F 21/32* | (2013.01) |
| *G06F 21/35* | (2013.01) |

(52) U.S. Cl.
CPC ............. *G06F 21/83* (2013.01); *G06F 21/32* (2013.01); *G06F 21/35* (2013.01); *H04L 63/04* (2013.01); *H04L 63/105* (2013.01); *H04L 63/20* (2013.01); *H04W 12/08* (2013.01); *G06F 2221/2111* (2013.01)

(58) Field of Classification Search
CPC ...................................................... G06F 21/83
See application file for complete search history.

(56) References Cited

U.S. PATENT DOCUMENTS

| | | | |
|---|---|---|---|
| 2002/0080256 A1 | 6/2002 | Bates et al. | |
| 2003/0068072 A1* | 4/2003 | Hamid ................. | G06K 9/0002 382/124 |
| 2004/0247289 A1 | 12/2004 | Choi | |
| 2006/0028558 A1* | 2/2006 | Sato .................... | H04N 1/00281 348/211.99 |
| 2006/0082456 A1 | 4/2006 | Marshall | |
| 2009/0102859 A1* | 4/2009 | Athsani .................... | G06F 3/011 345/619 |
| 2011/0025852 A1 | 2/2011 | Tanaka | |
| 2011/0196521 A1* | 8/2011 | Jain ....................... | H04L 12/281 700/94 |
| 2012/0054838 A1* | 3/2012 | Kim ......................... | H04L 63/10 726/4 |
| 2012/0327119 A1* | 12/2012 | Woo ...................... | G06F 16/435 345/633 |
| 2014/0152815 A1 | 6/2014 | Huang et al. | |
| 2015/0156465 A1 | 6/2015 | Tanaka | |

(Continued)

OTHER PUBLICATIONS

Denning, Tamara "In Situ with Bystanders of Augmented Reality Glasses: Perspectives on Recording and Privacy-Mediating Technologies" [Online] AMC [retrieved on Jul. 13, 2017]. Retrieved from the Internet: <URL: https://ar-sec.cs.washington.edu/files/ar-chi2014.pdf>.

(Continued)

*Primary Examiner* — Josnel Jeudy

(74) *Attorney, Agent, or Firm* — Haynes and Boone, LLP

(57) ABSTRACT

Systems and methods for providing privacy protection in the use of data capturing device are provided. A set of data capturing components of a mobile communications device is enabled to capture media data. A trigger event is detected. In response to detecting the trigger event, connectivity of the mobile communications device is restricted to limit at least one of the set of data capturing components.

20 Claims, 6 Drawing Sheets

(56) References Cited

U.S. PATENT DOCUMENTS

| | | |
|---|---|---|
| 2015/0201116 A1 | 7/2015 | Toriumi |
| 2016/0080642 A1 | 3/2016 | Jung et al. |
| 2016/0142684 A1 | 5/2016 | Gruder |
| 2016/0183812 A1* | 6/2016 | Zhang .................. A61B 5/7246 600/301 |
| 2017/0142377 A1 | 5/2017 | Tanaka |
| 2018/0241707 A1* | 8/2018 | Sarafa ............... H04M 1/72552 |

OTHER PUBLICATIONS

Pelletier, Sue "Meetings Get Real—and then Some—with Virtual and Augmented Reality Technology" [Online] Meetings Net [retrieved on Jul. 13, 2017]. Retrieved from the Internet: <URL: http://www.meetingsnet.com/event-tech/meetings-get-real-and-then-some-virtual-and-augmented-reality-technology>, Jan. 20, 2017.

Unknown "Police body cams secretly recording when thought to be off" [Online] Click on Detroit [retrieved on Jul. 13, 2017]. Retrieved from the Internet: <URL: https://www.clickondetroit.com/news/defenders/police-body-cams-secretly-recording-when-thought-to-be-off>, Jun. 21, 2016.

Lajka, Arijeta "Reports Suggest Body Cameras Are Only Effective When Cops Can't Turn Them Off" [Online] Vice News [retrieved on Jul. 13, 2017]. Retrieved from the Internet: <URL: https://news.vice.com/article/reports-suggest-body-cameras-are-only-effective-when-cops-cant-turn-them-off>, Mar. 25, 2015.

Goudie, Chuck, et al. "Officers file lawsuit after body cams record them non-stop" [Online] abc7chicago [retrieved on Jul. 13, 2017]. Retrieved from the Internet: <URL: http://abc7chicago.com/news/officers-file-lawsuit-after-body-cams-record-them-non-stop/1399056/>, Jul. 14, 2016.

Lemley, Mark A., et al. "Law, Virtual Reality, and Augmented Reality" [Online] Stanford Public Law Working Paper No. 2933867 and UCLA School of Law, Pulic Law Research Paper No. 17-13 [retrieved on Jul. 13, 2017]. Retrieved from the Internet: <URL: https://ssrn.com/abstract=2933867>, Mar. 15, 2017.

* cited by examiner

PROVIDING PRIVACY PROTECTION FOR DATA CAPTURING DEVICES

TECHNICAL FIELD

The subject technology generally relates to enhancing security features in data capturing devices and, in particular, relates to a system and method for providing privacy protection in the use of these devices, particularly in an augmented reality world.

BACKGROUND

The use of data capturing devices to record a variety of media has become increasingly more prevalent with the proliferation of mobile communications devices (e.g., smartphones, tablets, etc.). For example, mobile communications devices are widely used to capture visual and audio content. In many instances, mobile communications devices are used to provide augmented reality by "going live" and recording daily activities. While connectivity to the internet (e.g., via Wi-Fi, cellular and other networks) allows for augmented reality and many other features and applications to be made available to mobile communications devices, such connectivity also provides gateways for unscrupulous individuals to covertly access the devices to record or peer into the lives of others. For example, a mobile communications device may be hacked to provide unauthorized use of a combination of the camera, microphone and other recording devices to view or record events from the mobile communications device without the knowledge of the owner/operator of the mobile communications device. These types of breaches raise both security as well as privacy issues.

SUMMARY

According to various aspects of the subject technology, a system for shutting down the recording abilities of a data capturing device is provided. The system comprises a non-transitory memory storing instructions, and one or more hardware processors coupled to the non-transitory memory and configured to read the instructions from the non-transitory memory to cause the system to perform certain operations. A trigger event may be detected by the device, and in response to the detection of the trigger, the connection level of the device to a network may be modified to prevent the access of certain features of the device (e.g., video and or audio capture). In some instances, the device may be completely disconnected from the network. In other instances, the device may be switched to a limited connectivity mode where certain services are rendered unavailable or unusable. The determination of the level of connectivity may be made based on the detection of different situations or environments with relation to the mobile communications device.

According to various aspects of the subject technology, a method for providing privacy protection in the use of data capturing devices is provided. A set of data capturing components of the mobile communications device may be enabled to capture at least one of audio and visual data. A trigger event may be detected by the processor of the mobile communications device. In response to detecting the trigger event, connectivity of the mobile communications device may be restricted to limit at least one of the set of data capturing components. Additionally, data recorded by the set of data capturing components of the mobile communications device for a period of time leading up to a time at which the trigger event is detected may be caused to be deleted.

According to various aspects of the subject technology, a non-transitory machine-readable medium having stored thereon machine-readable instructions executable to enhance security features in a data capturing device is provided. A set of data capturing components of a mobile communications device is enabled to capture at least one of audio and visual data. A trigger event may be subsequently detected, and in response to detecting the trigger event, connectivity of the mobile communications device may be restricted to limit at least one of the set of data capturing components.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Figure 1:
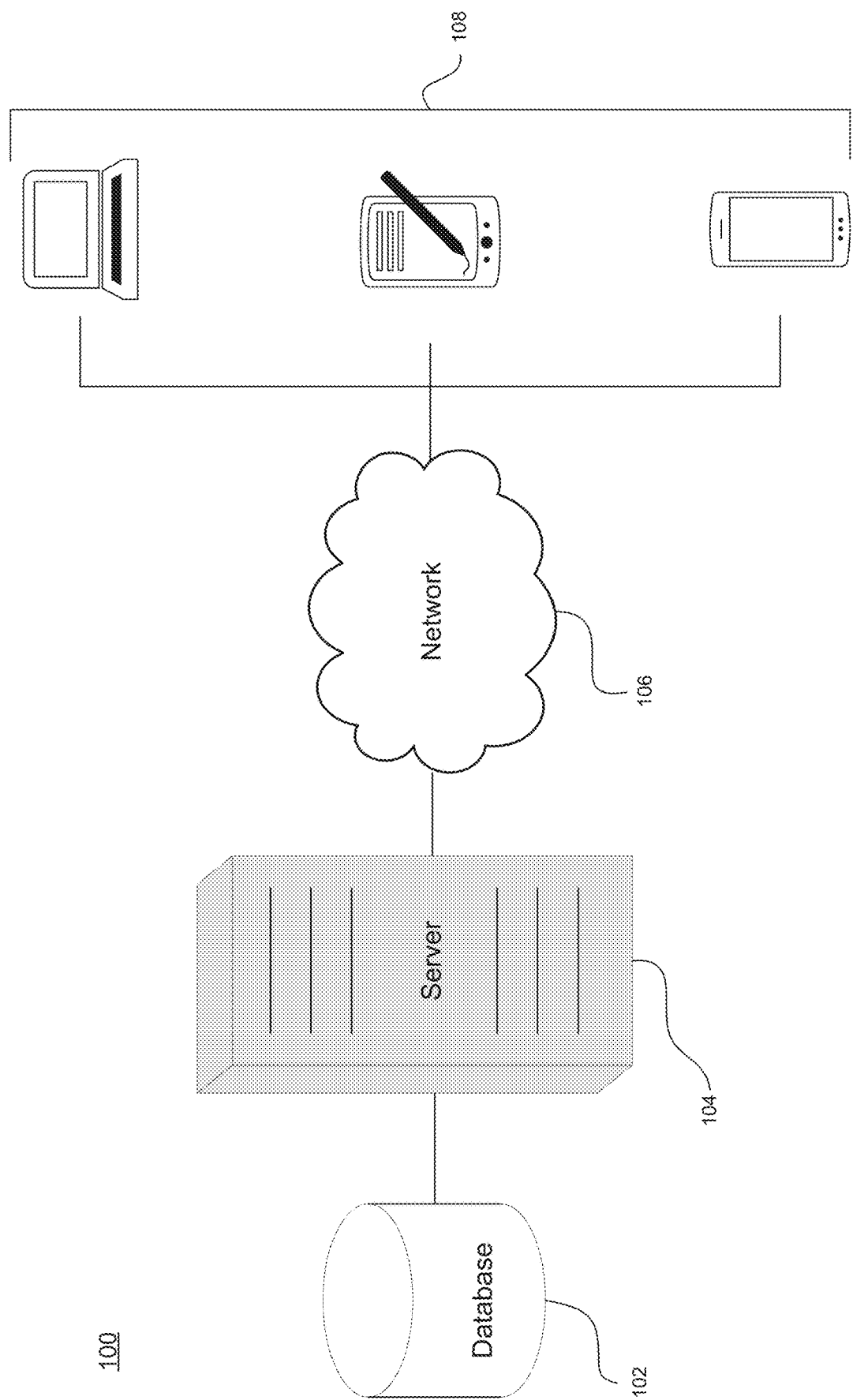
FIG. 1 illustrates an example network environment of a system for providing privacy protection in the use of data capturing devices, in accordance with various aspects of the subject technology.

According to various aspects of the subject technology, FIG. 1 illustrates an example of a system that includes an alternative reality device for which privacy protection may be provided. System 100 may comprise one or more servers 104 connected to one or more client devices 108 (e.g., mobile communications devices) via a network 106 (e.g., the Internet, a wide area network, a local area network, etc.). The one or more servers 104 may also be connected to one or more databases 102. The database 102 may be used to store a variety of data that is used by the server 104 and/or the client devices 108. For example, upon request from a client device 108, the server 104 may retrieve certain information from the database 102 and send them to the requesting client device 108. The client device 108 may utilize the retrieved information for performing certain functions. The client device 108 may also generate and/or record a variety of data (e.g., video data, audio data, metadata, etc.) that may be uploaded to the database 102 via the server 104. In some instances, the database 102 is a cloud-based database. Cloud-based databases refer to data storage in which the data is stored in logical pools corresponding to physical storage that spans multiple servers in different locations that are operated by one or more hosts. Data stored in these databases are kept readily available and accessible to requesting devices.

Figure 2:
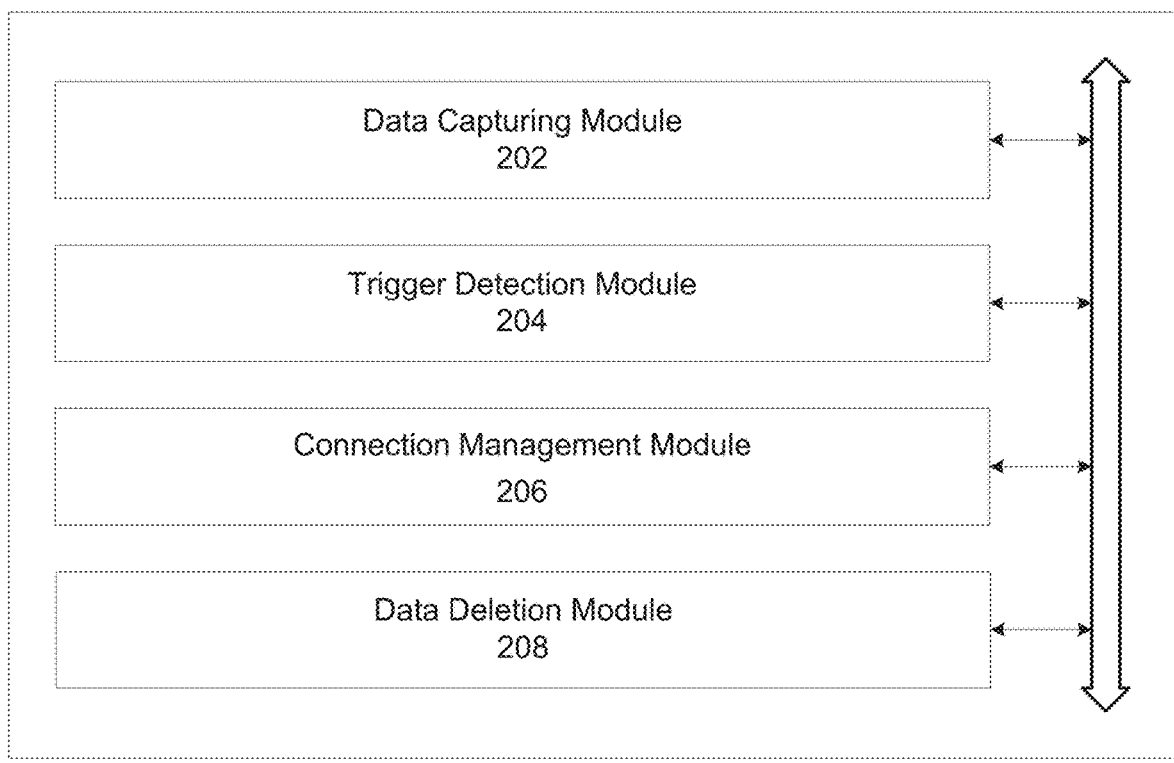
FIG. 2 illustrates an example of components of the system for providing privacy protection in the use of data capturing devices, in accordance with various aspects of the subject technology.

FIG. 2 illustrates an example of a system utilized to provide privacy protection in the use of data capturing devices, in accordance with various aspects of the subject technology. System 200 comprises data capturing module 202, trigger detection module 204, connection management module 206 and data deletion module 208. These modules may be in communication with one another. In some aspects, the modules may be implemented in software (e.g., subroutines and code). The software implementation of the modules may operate on a client device 108 application that is running a specific language compatible to the modules. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Data capturing module 202 provides data capturing capabilities to the data capturing device for recording a variety of media data. For example, the data capture module may include one of a camera, a microphone, and a module for capturing metadata. The camera may be used to capture still images or videos. Videos captured by the camera may include accompanying audio captured by the microphone. In some instances, the microphone may capture standalone audio without video. In addition to images, videos and audio, the data capturing module may further record metadata for the device. The metadata captured may be associated with the images, video and/or audio media that have been captured. For example, the metadata may provide an indication of the location and time at which associated media is captured. Alternatively, the metadata captured can also represent one of a variety of states of the data capturing device independent from the capture of images, video and audio.

System 200 further comprises a trigger detection module 204 configured to monitor for and identify a trigger event based on one of a variety of inputs. In one instance, trigger detection module 204 may utilize the microphone of data capturing module 202 to detect a string of words that suggest a certain level of privacy is expected. For example, the microphone may pick up a string of words spoken by an individual and trigger detection module 204, which monitors inputs from the microphone, may identify the string of words being related to the start of a business meeting. Other example detection of trigger events may be the identification of an event on a calendar occurring at a current time and location, the detection of a location of the device to be in an area where there is an expectation of privacy, and the detection of certain biometric characteristics of the user of the device.

When a trigger event is detected, trigger detection module 204 may instruct connection management module 206 to restrict the connectivity of the device to limit the access of the data capturing device. In some instances, connection management module 206 may disconnect the mobile communications device from a network altogether. In other instances, connection management module 206 may place the mobile communications device in a limited connectivity mode. The level of the connectivity limitation may be determined based on a user preference. Likewise, the sensitivity of the detection of trigger events may also be based on the user preference.

In some embodiments, in addition to restricting the connectivity of the device, data deletion module 208 may cause a deletion of data recorded by data capturing module 202 for a period of time leading up to a time at which the trigger event is detected. In some instances, the detection of a trigger event may occur after some media has already been recorded. For example, if a device is recording as an individual walks into a meeting, a trigger event may be detected immediately. Thus, some media may be recorded of the meeting. Such recordings can sometimes be of sensitive or private matter (e.g., confidential meeting in this case), as indicated by the detection of a trigger event. Since the connectivity of the device was not limited until some recordation of sensitive or private material having been made, a deletion of such material may be necessary. Accordingly, data deletion module 208 may cause, retroactively, the deletion of sensitive or private media that may have been recorded immediately preceding the detection of a trigger event to ensure that privacy and security is maintained.

Figure 3:
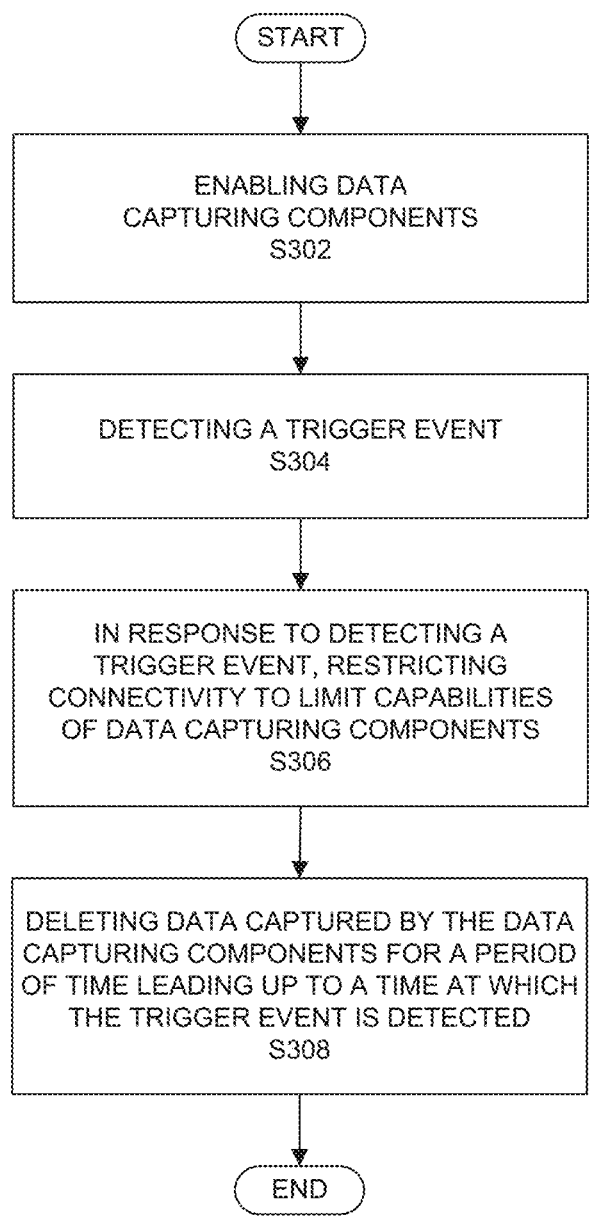
FIG. 3 illustrates an example method for providing privacy protection in the use of data capturing devices, in accordance with various aspects of the subject technology.

FIG. 3 illustrates an example of method 300 for providing privacy protection in the use of data capturing devices, in accordance with various aspects of the subject technology. In step S302, data capturing components are enabled to capture an assortment of media from a device (e.g., a mobile communications device) on which it resides. As discussed in reference to FIG. 2, the data capturing components may include some combination of a camera, a microphone, and a module for capturing metadata. Enabling each of these components on a mobile communications device allows them to record associated media. For example, the camera may be used to capture still images or videos. With the accompaniment of the microphone, audio media may be recorded along with the videos. Alternatively, the microphone may capture standalone audio without video. In other words, the data capturing components can capture audio data, video data, still image data, and audio and video data.

The module for capturing metadata may further record information provided by the mobile communications device such as time, date and location. Data such as the setting of the devices used may additionally be recorded. The metadata that is recorded may be associated with other recorded media such as images, video tracks and audio tracks. For example, the time and location of an image capture may be recorded as metadata of the image. Similar information may be recorded for video and audio captures.

In some embodiments, the data capturing components are utilized for augmented reality experiences. That is, the images captured by the camera may be augmented to provide additional information, and fed back to a display on the mobile communications device in real-time. Similarly, the audio that is picked up by the microphone may be augmented in real-time and output from the mobile communications device (e.g., to a set of connected headphones). One example of such usage is the use of augmented reality goggles. When a user wears a set of these goggles, the camera captures images in the direction in which the goggles face, and presents its images on a screen within the goggle as if the user is looking through a clear lens. The images presented on the screen inside the goggles may be augmented with additional material, such as navigations arrows or instructions.

In order for the augmented reality device to function properly, the camera must be enabled to capture images. However, enabling camera, microphone and other data capturing capabilities while the mobile communications device is connected to a network opens the mobile communications device to being hacked. For example, a hacker may covertly access the components of the mobile communications device to record or peer into the unsuspecting owner's mobile communications device content. Such unauthorized access raises both security and privacy issues.

While breaches may have seemingly harmless consequences in certain situations, breaches may result in serious harm in other situations. For example, when a breach occurs during a confidential meeting where sensitive information is being communicated, or at a time and place where privacy is expected (e.g., at home with family), significant consequences may be experienced by subjects who have been recorded by the mobile communications device. Accordingly, in step S304, a trigger event may be detected.

Trigger events are events that suggest that privacy may be required at the time of the trigger event. In one embodiment, a trigger event is detected as a string of spoken words. For example, during a conversation, an individual may say, "this conversation is strictly confidential," or "please keep this between me and you." In such instances, the mobile communications device may pick up the conversation with a microphone, process the audio with speech recognition software, and determine whether the words spoken match a list of predetermined strings of words indicating an expectation of privacy. A trigger event is detected when a match is determined. This detection may be performed continuously by the mobile communications device as long as an audio input is being recorded/monitored by the microphone.

In another embodiment, a trigger event may be detected as the mobile communications device being within a predetermined distance of certain individuals (as indicated by their respective mobile communications devices). Returning to the example of a work setting, an expectation of privacy may be indicated by an individual being within close proximity with his immediate supervisor. Thus, the individual being within a predetermined distance from his supervisor may be detected as a trigger event. Likewise, an individual being within close proximity with his spouse may likewise be detected as a trigger event, as family time is another instance where privacy may be expected.

Similar to the detection of two individuals being within close proximity to one another, the detection of the mobile communications being within close proximity to a predetermined location may likewise be a trigger event. For instance, a conference room in an office may be labeled as an area where confidential information is typically shared. As such, a mobile communications device coming within a predetermined distance to the conference room may be detected as a trigger event. As with the detection of a string of text, the detection of proximity may be performed by a location determination device (e.g., GPS or other device) in a continuous manner.

In another embodiment, certain events on a calendar occurring at a current time and location of the mobile communications device may be detected as a trigger event. With the presumption that business meetings are to be kept confidential, such meetings, when scheduled on an individual's calendar become a trigger event when the time of the meeting approaches and the individual moves towards the location of the meeting. In this instance, the calendar event is an event scheduled on an individual's electronic calendar application. Electronic calendar events typically include a time and a location. In the event a location is not provided, however, the trigger event may simply be detected as the time for which the calendar event is scheduled. To perform such a detection, trigger detection module 204 must be provided access to the calendar of the mobile communications device.

In yet another embodiment, biometric characteristics of a user of the mobile communications device may be measured to determine certain trigger events. For example, a rise in blood pressure and or pulse rate may be detected as a trigger event. Using biometrics to determine a physiological state, an assumption of an individual's mental state may be made. In some instances, a sudden rise in heart rate and blood pressure may suggest that the individual is nervous or uncomfortable. In such instances, the individual may not want to be subject to video and/or audio recordings. The measured biometric characteristics may be compared to predetermined levels, and when the measured number exceeds that which has been predetermined, a trigger event will be detected as having occurred.

The above examples provide a number of baseline characteristics that may vary from user to user. For example, a user may set preferences as to how long before the start of a meeting should the detection of a trigger event be made. Likewise, the user may preset a minimum distance from a private location that causes a trigger event to be detected. As for the biometric readings, a baseline (e.g., of blood pressure, resting heart rate, etc.) may be measured. From there, the user may set an amount of deviation from baseline that causes a trigger event to be detected. One of ordinary skill in the art may appreciate that the above-mentioned preferences are exemplary, and that a number of additional settings may be user determined for the purpose of detecting a trigger event.

In response to the detection of a trigger event in step S304, the connectivity of the mobile communications device is restricted in step S306. In one embodiment, restricting the connectivity of the mobile communications device results in limited capabilities of the data capturing components. For example, completely cutting the mobile communications device off from the network to which it is connected will ensure that none of the data capturing components may be connected to by a remote device. In other words, disconnecting from the network prevents hackers from hacking into the mobile communications device. By disconnecting from the network after a trigger event is detected, the mobile communications device is made secure from hackers during those instances where a user of the mobile communications needs privacy. Complete cut-off from the network will also ensure that the hacker will not have access to any of the recorded media (e.g., video data, audio data, image data, metadata, etc.) stored on the mobile communications device.

Alternatively, the connectivity of the mobile communications device can be restricted in step S306 to a limited connectivity mode. In other words, the connectivity may be at a level where essential functions can be executed, but more ancillary functions such as capturing images/videos and audio data are not executable. Additionally, certain connection modules (e.g., Bluetooth, WiFi, cellular etc.) may be either limited or completely shut off. In some instances, the connection bandwidth may be restricted to a point where it would be impractical for video and/or audio media to be communicated from the mobile communications device.

In some embodiments, the restriction of the connectivity of the mobile communications device may also limit the accessibility of certain files in a storage repository on the mobile communications device. For example, the user of the mobile communications device may organize the storage repository to include different levels of privacy. In some instances, a photo album may include a folder that is marked private and requires additional measures (e.g., entering a password/pass code, using fingerprint scan, etc.) to obtain access. In another instance, the user's private information (e.g., personal identification information, payment information for electronic payment applications, etc.) may be stored in a section of the storage repository designated as private by default. When a restriction of connectivity is initiated, these private folders may be firewalled off from being accessed so as to increase security and prevent access by a hacker.

In some embodiments, captured data may be deleted from the mobile communications device in step S308. More specifically, data that was captured for a period of time leading up to the time at which the trigger event is detected may be deleted. In doing so, the mobile communications device ensures that potentially sensitive data that may have been recorded immediately prior to the detection of a trigger is not made available. For example, when a mobile communications device is brought into a meeting setting, a string of text (e.g., "please keep this information confidential") may be detected to be a trigger event after the meeting has already started. Since the trigger occurs after the meeting start, and media may have been recorded from the start of the meeting until the trigger event is detected, certain information that should be kept in private may reside in the recorded media. As such, it may be necessary to delete this data.

The determination of how much of the recorded media leading up to the trigger event should be deleted may be calculated in a number of different fashions. In one instance, media recorded within a predetermined period of time leading up to the trigger event may be deleted. This predetermined period of time may be set in the user preferences, and may have a preset value such as five minutes. In another example, the mobile communications device may determine when an event may have commenced prior to the trigger event. One manner in which this determination may be made is by detecting an increase in audio input (e.g., when someone starts speaking after relative silence), or detecting spoken words following the detection of indiscernible voices (e.g., the commotion that occurs from multiple people carrying on concurrent conversations before a single person begins speaking in the meeting). Either of the two situations may signify the start of a meeting.

Another signal that may be considered is the time of day. Since meetings generally start at the top of the hour or at half past the hour, the time at which the trigger event is detected may lend some information as to when the cutoff of recorded media should have occurred. For example, if the trigger event is detected at 10:05 am, any media that was recorded from 10:00 am until 10:05 am may be deleted on the presumption that the trigger event corresponds to a start of a meeting scheduled for 10:00 am. Since the connectivity of the mobile communications device is restricted after 10:05 am, thereby limiting the capabilities of the data capturing components, no media would have been recorded from 10:05 am onward. Accordingly, the data deletion is executed retroactively to complement the limited capabilities to ensure that sensitive information is not maintained on the mobile communications device.

In some embodiments, the sensitivity of the detection of the trigger event may be adjusted by the user. For example, where a trigger event is detected as a string of words, different sensitivities may relate to different strings in the predetermined list. The list may categorize different strings as corresponding to different sensitivity levels. For example, the lowest sensitivity level may require the detection of a string such as "Please keep this strictly confidential," whereas a higher sensitivity may detect "Let's start this meeting" as a trigger event. Adjustment in the sensitivity level may also change the predetermined minimal distance between the mobile communications device and certain individuals or locations before a trigger is detected. As discussed above, such adjustments may be made via user preferences.

Figure 4:
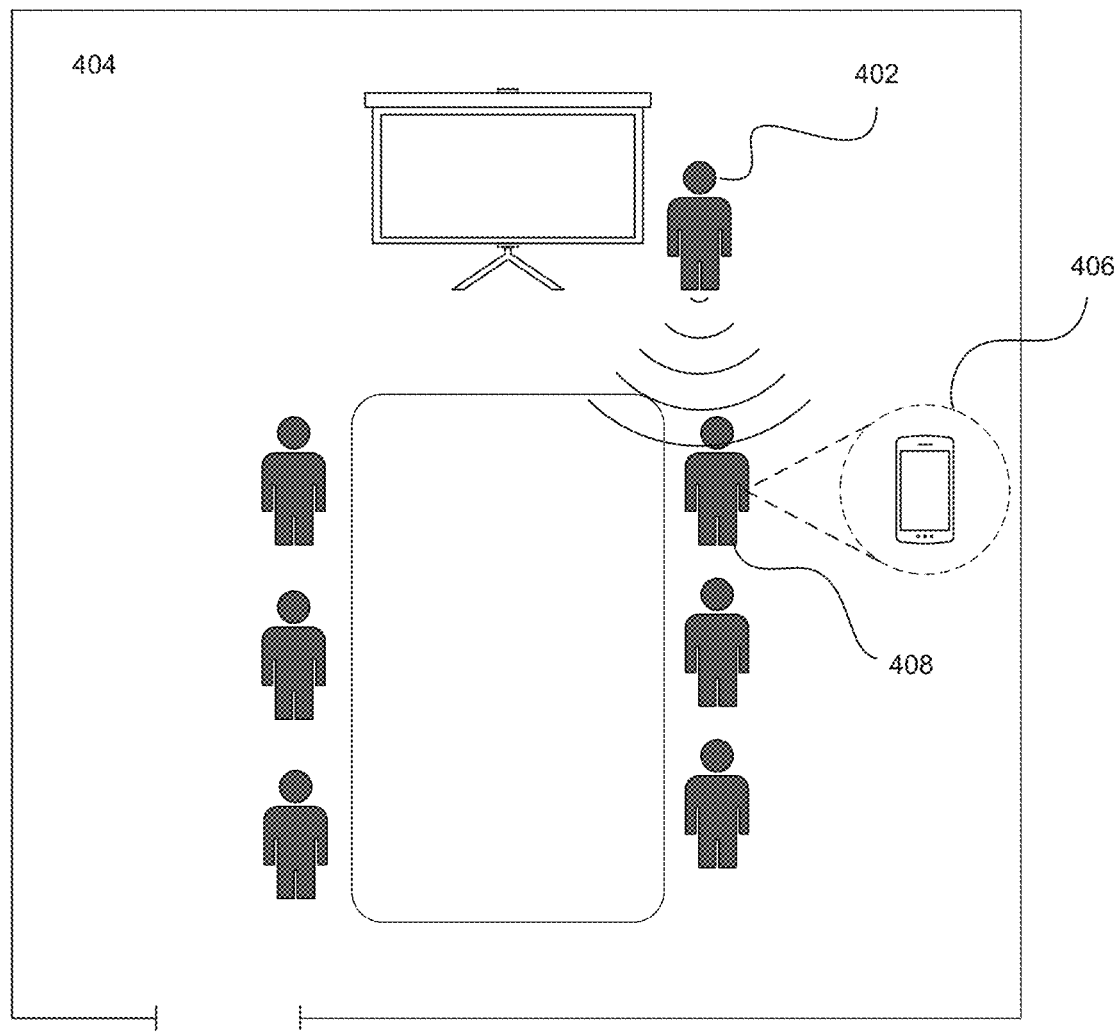
FIG. 4 provides a graphical representation of the detection of a string of words as a trigger event, in accordance with various aspects of the subject technology.

FIG. 4 provides a graphical representation of the detection of a string of spoken words as a trigger event. In this representation, speaker/moderator 402 presents at a meeting in conference room 404. During the presentation, an audio input at the microphone may be monitored by a mobile communications device 406 in the possession of an attendee 408 of the meeting. As discussed above, this detection may be performed continuously by the mobile communications device. When the audio input from the ongoing presentation includes a string of text that is found to be a match to one of a list of predetermined strings of words, a trigger is detected, thus indicating an expectation of privacy. Upon detection of this trigger, the connectivity of the mobile communications device is restricted, resulting in limited capabilities of the data capturing components as discussed above in reference to FIG. 3. In some instances, media may have been recorded leading up to the detection of the trigger event. Under such circumstances, a certain amount of recorded media may be deleted. Specifically, media recorded within a predetermined period of time leading up to the trigger event may be deleted. Alternatively, the mobile communications device may determine when an event may have commenced prior to the trigger event, and delete the recorded media from that time onward. This deletion is to ensure that, in the event a trigger event is detected sometime after the meeting has commenced, that media that may have been recorded at the start of the meeting is duly deleted to prevent the potential for inadvertent dissemination of sensitive or private information.

In some embodiments, the detection of trigger events may help build an artificial intelligence (AI) data structure using an AI algorithm. For example, the detection of a string of words as a trigger event may lead to adding additional strings of words to the list of predetermined strings of words. In other words, the resulting AI data structure may be classified based upon some historical taxonomy.

In some embodiments, historical data may be retrieved and used to train the AI algorithms. Once sufficiently trained, an AI data structure may be implemented to detect a broader list of strings of words. Some example embodiments may include any number of deterministic algorithms implemented in the AI algorithm database, including case-based reasoning. Bayesian networks (including hidden Markov models), neural networks, or fuzzy systems. The Bayesian networks may include machine learning algorithms such as supervised learning, unsupervised learning, semi-supervised learning, reinforcement learning, transduction, learning to learn algorithms, or some other suitable Bayesian network. The neural networks may include Kohonen self-organizing network, recurrent networks, simple recurrent networks, Hopfield networks, stochastic neural networks, Boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network. Further, the neural networks may include machine learning algorithms including supervised learning, unsupervised learning, semi-supervised learning, reinforcement learning, transduction, learning to learn algorithms, or some other suitable learning algorithm.

Figure 5:
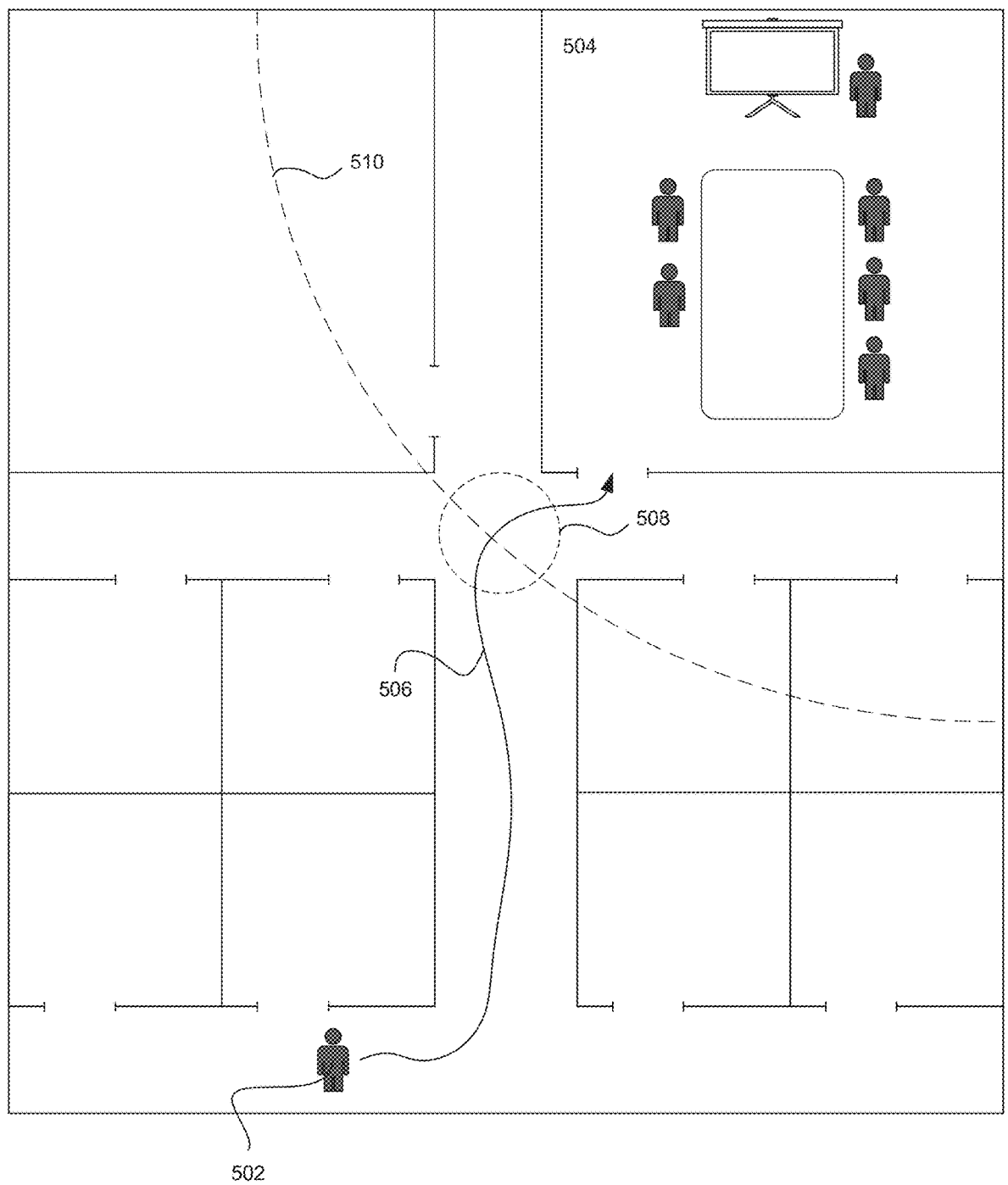
FIG. 5 provides a graphical representation of the detection of a mobile communications device being within close proximity to a predetermined location as a trigger event, in accordance with various aspects of the subject technology.

FIG. 5 provides a graphical representation of the detection of a mobile communications device being within close proximity to a predetermined location as a trigger event. As shown in the figure, as individual 502 approaches conference room 504 via path 506, a trigger event is detected at area 508 where the path crosses perimeter 510 of the conference room. While this representation shows perimeter 510 as a semicircle of a predefined distance from conference room 504, one of ordinary skill in the art may appreciate that perimeter 510 may take on any of a variety of characteristics. For example, perimeter 510 may simply be the area immediately outside the entrance to conference room 504. Alternatively, perimeter 510 may even be drawn as the wall edges of conference room 504. A trigger event is thus detected once individual 502 crosses the perimeter (e.g., is within a predetermined distance of conference room 504).

Crossing the perimeter suggests that individual 502 is within close proximity to a predetermined location where there's an expectation of privacy. As such, the connectivity of a mobile communications device that is in the possession of individual 502 may be restricted, thereby resulting in limited capabilities of the data capturing components. Additionally, media may have been recorded leading up to the detection of the trigger event. For example, as individual 502 approaches conference room 504 but before perimeter 510 is crossed, media may be recorded, and may even capture a conversation occurring within conference room 504. Under such circumstances, the deletion of a certain amount of recorded media may be appropriate. Specifically, media recorded within a predetermined period of time leading up to the trigger event (i.e., crossing the perimeter) may be deleted. This deletion is to ensure that media that may have recorded sensitive information is deleted to prevent potential inadvertent dissemination of sensitive or private information.

In some embodiments, instead of proximity to a particular location, a trigger event is detected based on proximity to another individual. While the location of the other individual is not static, the remaining concepts of making a determination based on a perimeter remains. In other words, two individuals being within close proximity (within a predefined perimeter distance) to one another is detected as a trigger event. In both instances, the detection of proximity may be performed by a location determination device on the mobile communications device either periodically or in a continuous manner.

The foregoing description provides a mobile communications device as a representative example of a data capturing device. The mobile communications device may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

In one instance, these features allow a user to run augmented reality applications. For example, the camera may be enabled to capture images that are displayed on the display element. The captured images may be processed to include additional information (e.g., data related to the captured image, navigation prompts, special icons, etc.) for display. In some embodiments, the user may interact with the additional elements, e.g., selecting an icon presented on the augmented reality display. While the use of these features provides many conveniences to a user, they also provide a gateway for hackers to compromise the security and privacy of the device. As such, a system and method for providing privacy protection in the use of data capture devices is provided to address the potential issues.

Figure 6:
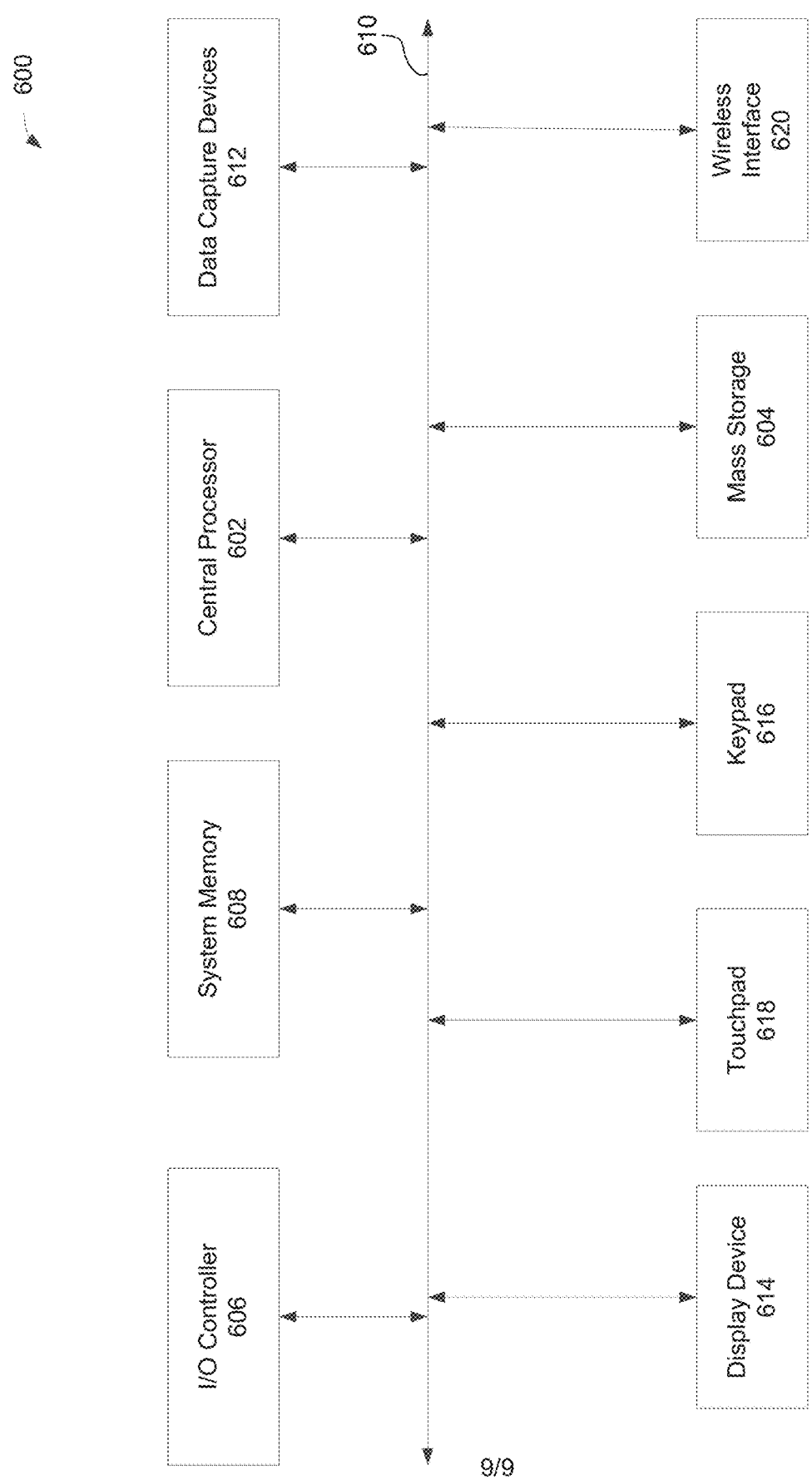
FIG. 6 is a block diagram illustrating components of a mobile communications device, in accordance with various aspects of the subject disclosure.

FIG. 6 is a block diagram illustrating components of a mobile communications device 600, in accordance with various aspects of the subject disclosure. Mobile communications device 600 comprises central processor 602, mass storage 604, input/output (I/O) controller 606, system memory 608, and bus 610. Bus 610 may be any suitable communication mechanism for communicating information. Central processor 602, mass storage 604, I/O controller 606, and system memory 608 are coupled with bus 610 for communicating information between any of the modules of mobile communications device 600 and/or information between any module of mobile communications device 600 and a device external to mobile communications device 600. For example, information communicated between any of the modules of mobile communications device 600 may include instructions and/or data. In some aspects, bus 610 may be a universal serial bus. In some aspects, bus 610 may provide Ethernet connectivity.

In some aspects, central processor 602 may comprise one or more processors, where each processor may perform different functions or execute different instructions and/or processes. For example, one or more processors may execute instructions for system 100, one or more processors may control data capture devices 612, and one or more processors may execute instructions for input/output functions.

System memory 608 may be random access memory ("RAM") or other dynamic storage devices for storing information and instructions to be executed by central module 602. System memory module 608 may also be used for storing temporary variables or other intermediate information during execution of instructions by central processor 602. In some aspects, system memory 608 may comprise battery-powered static RAM, which stores information without requiring power to maintain the stored information. Mass storage 604 may be a magnetic disk or optical disk and may store information and instructions. In some aspects, mass storage 604 may comprise hard disk storage or electronic memory storage (e.g., flash memory). In some aspects, system memory 608 and mass storage 604 are both a machine-readable medium.

Mobile communications device 600 is coupled via I/O controller 606 to a user interface for providing information to and receiving information from an operator of system 100. For example, the user interface may include display device 614 for displaying information to an operator. The user interface may also include, for example, keypad 616 and/or a touchscreen 618 on the mobile communications device 600 for communicating information and command selections to central processor 602.

According to various aspects of the subject disclosure, methods described herein are executed by mobile communications device 600. For example, data capturing module 202 may record graphical representations of one or more subjects within a view of a camera. Additionally, trigger detection 204 may detect a trigger event that causes connection management module 206 to restrict the connection to mobile communications device 600. To perform these functions, central processor 602 of mobile communications device 600 executes one or more sequences of instructions contained in system memory 608 and/or mass storage 604. In one example, instructions may be read into system memory 608 from another machine-readable medium, such as mass storage 604. In another example, instructions may be read directly into system memory 608 from I/O controller 606, for example from an operator of system 100 via the user interface.

Execution of the sequences of instructions contained in system memory 608 and/or mass storage 604 causes central processor 602 to perform methods to restrict the connectivity of mobile communications device 600 via wireless interface 620. For example, a computational command for restricting connectivity may be stored in system memory 608 and/or mass storage 604 as one or more sequences of instructions. Other information, such as user preferences, may be communicated between central processor 602, system memory 608 and/or mass storage 604 via bus 602. In some aspects, the information may be communicated from central processor 602, system memory 608, and/or mass storage 604 to I/O controller 606 via bus 602. The information may then be communicated from I/O controller 606 to an operator via the user interface.

One or more processors in a multi-processing arrangement may also be employed to execute the sequences of instructions contained in system memory 608 and/or mass storage 604. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to central processor 602 for execution. Such a medium may take many forms, including, but not limited to, non-volatile media, and volatile media. Non-volatile media include, for example, optical or magnetic disks, such as mass storage 604. Volatile media include dynamic memory, such as system memory 608. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
a non-transitory memory storing instructions; and
one or more hardware processors coupled to the non-transitory memory and configured to read the instructions from the non-transitory memory to cause the system to perform operations comprising:
enabling a set of data capturing components of a mobile communications device to capture media data;
in response to enabling the set of data capturing components, enabling a language detection operation of the mobile communications device associated with a predetermined string of words for the mobile communications device to restrict the set of data capturing components;
detecting a trigger event associated with the predetermined string of words using the language detection operations;
causing a deletion of data recorded by at least one of the set of data capturing components of the mobile communications device for a period of time leading up to a time at which the trigger event is detected; and
restricting, in response to detecting the trigger event, connectivity of the mobile communications device to limit at the least one of the set of data capturing components.

2. The system of claim 1, wherein the media data includes audio data, visual data, or audio and visual data.

3. The system of claim 1, wherein detecting the trigger event further includes one of: detecting certain individuals within a predetermined distance, detecting an event on a calendar occurring at a current time and location, detecting a location of the mobile communications device being at a predetermined location, or detecting that biometric characteristics of a user of the mobile communications device exceeds that of predetermined levels of the biometric characteristics.

4. The system of claim 1, wherein restricting the connectivity of the mobile communications device includes one of disconnecting the mobile communications device from a network or placing the mobile communications device in a limited connectivity mode.

5. The system of claim 1, wherein the set of data capturing components includes a camera, a microphone, or both the camera and the microphone.

6. The system of claim 1, wherein the operation further comprises enabling the set of data capturing components of the mobile communications device to capture metadata.

7. The system of claim 1, wherein the data capturing components in combination with a display device of the mobile communications device are utilized to provide an augmented reality to a user of the mobile communications device.

8. The system of claim 1, wherein the mobile communications device includes one of a smartphone, a tablet, a laptop, or a pair of augmented reality spectacles.

9. The system of claim 1, wherein the period of time is a predetermined duration.

10. The system of claim 1, wherein the period of time is determined based on a review of data captured in order to identify a start of an event.

11. A method, comprising:
enabling, via a processor of a mobile computing device, a set of data capturing components of a mobile communications device to capture audio data, visual data, or audio and visual data;
in response to enabling the set of data capturing components, enabling a language detection operation of the mobile communications device associated with a predetermined string of words for the mobile communications device to restrict the set of data capturing components;
detecting, by the processor of the mobile communications device, a trigger event associated with the predetermined string of words using the language detection operations; and
in response to detecting the trigger event:
restricting connectivity of the mobile communications device to limit at least one of the set of data capturing components, and
causing a deletion of data recorded by at least one of the set of data capturing components of the mobile communications device for a period of time leading up to a time at which the trigger event is detected.

12. The method of claim 11, wherein method further comprises enabling the set of data capturing components to capture:
metadata associated with the data recorded; and
biometric characteristics of a user of the mobile communications device.

13. The method of claim 12, wherein detecting the trigger event further includes one of detecting certain individuals within a predetermined distance, detecting an event on a calendar occurring at a current time and location, detecting a location of the mobile communications device being at a predetermined location, or detecting that biometric characteristics of a user of the mobile communications device exceeds that of predetermined levels of the biometric characteristics.

14. The method of claim 12, wherein biometric characteristics include at least one of a pulse rate, a blood pressure, or a body temperature.

15. The method of claim 11, wherein the data capturing components in combination with a display device of the mobile communications device are utilized to provide an augmented reality to a user of the mobile communications device.

16. The method of claim 11, wherein the period of time is determined based on a review of data captured in order to identify a start of an event.

17. The method of claim 11, wherein the trigger event is detected based on user preferences, the user preferences being adjustable by a user to increase or decrease a sensitivity of the detection.

18. A non-transitory machine-readable medium having stored thereon machine-readable instructions executable to cause performance of operations comprising:
enabling a set of data capturing components of a mobile communications device to capture audio data, visual data, or audio and visual data;
in response to enabling the set of data capturing components, enabling a language detection operation of the mobile communications device associated with a predetermined string of words for the mobile communications device to restrict the set of data capturing components;
detecting a trigger event associated with the predetermined string of words using the language detection operations;

causing a deletion of data recorded by at least one of the set of data capturing components of the mobile communications device for a period of time leading up to a time at which the trigger event is detected; and restricting, in response to detecting the trigger event, connectivity of the mobile communications device to limit at least one of the set of data capturing components.

19. The non-transitory machine-readable medium of claim 18, wherein detecting the trigger event further includes one of detecting certain individuals within a predetermined distance, detecting an event on a calendar occurring at a current time and location, detecting a location of the mobile communications device being at a predetermined location, or detecting that biometric characteristics of a user of the mobile communications device exceeds that of predetermined levels of the biometric characteristics.

20. The non-transitory machine-readable medium of claim 18, wherein the period of time is determined based on a review of data captured in order to identify a start of an event.

* * * * *